United States Patent [19]
Frigo

[11] Patent Number: 5,760,940
[45] Date of Patent: Jun. 2, 1998

[54] METHODS FOR MONITORING OPTICAL PATH CHARACTERISTICS IN AN OPTICAL COMMUNICATION SYSTEM

[75] Inventor: Nicholas J. Frigo, Atlantic Highlands, N.J.

[73] Assignee: Lucent Technologies Inc., Murray Hill, N.J.

[21] Appl. No.: 549,617

[22] Filed: Oct. 27, 1995

[51] Int. Cl.⁶ .................................................. H04B 10/08
[52] U.S. Cl. .................................. 359/173; 359/110
[58] Field of Search ........................... 359/110, 173, 359/175, 177, 137, 135, 167

[56] References Cited

U.S. PATENT DOCUMENTS

| | | | |
|---|---|---|---|
| 4,435,849 | 3/1984 | Ilgner et al. | 359/177 |
| 4,451,916 | 5/1984 | Casper et al. | 359/110 |
| 4,911,515 | 3/1990 | So et al. | 359/110 |
| 5,157,652 | 10/1992 | Walker | 370/17 |
| 5,285,305 | 2/1994 | Cohen et al. | 359/110 |
| 5,335,104 | 8/1994 | Johnson | 359/110 |
| 5,349,457 | 9/1994 | Bears | 359/118 |
| 5,355,238 | 10/1994 | Kight et al. | 359/135 |
| 5,416,628 | 5/1995 | Betti et al. | 359/181 |
| 5,491,574 | 2/1996 | Shipley | 359/110 |
| 5,548,432 | 8/1996 | Clark et al. | 359/110 |

FOREIGN PATENT DOCUMENTS

| | | | |
|---|---|---|---|
| 4427973 | 2/1995 | Germany | H04L 29/14 |
| 0198232 | 8/1990 | Japan | H04B 10/00 |
| 2113036 | 7/1983 | United Kingdom | H04B 9/00 |
| 2123236 | 1/1984 | United Kingdom | H04B 9/00 |
| 92011710 | 7/1992 | WIPO | H04B 10/28 |

*Primary Examiner*—Rafael Bacares
*Attorney, Agent, or Firm*—Brian K. Dinicola

[57] ABSTRACT

An optical distribution network using optical fibers connects a central office terminal to a number of optical network units which service respective subscribers. In order to monitor the onset and pace of signal degradation in the individual fibers of the network, an optical carrier signal is modulated with an amplitude-varied signal including at least two different amplitude levels that are above a selected amplitude threshold. At least one of the amplitude levels is chosen so that a portion of the signal having the chosen amplitude will not be reliably detected when a fiber in the path between the central office terminal and a destination optical network unit fails to meet a specified threshold power margin. Specifically, the amplitude-varied optical signal is transmitted from the central office terminal to each optical network unit, and a version or replica of the signal is returned by each optical network unit to the central office terminal, where a monitoring device attempts to detect the signal portions in the returned replica signals having the chosen amplitude. Non-detection of some or all of the signal portions having the chosen amplitude indicates that the power margin of a fiber link has fallen below the threshold.

29 Claims, 3 Drawing Sheets

"CHALKBOARD"

MODULATOR

TO CO 9 dB MARGIN 6 dB MARGIN 3 dB MARGIN

METHODS FOR MONITORING OPTICAL PATH CHARACTERISTICS IN AN OPTICAL COMMUNICATION SYSTEM

BACKGROUND OF THE INVENTION

1. Field of the Invention

This invention relates to optical fiber communication networks and, more particularly, to systems and methods for monitoring the performance characteristics of fiber links employed in such networks.

2. Related Art

Fiber optic transmission technology has now advanced from its embryonic field trial status to the position of market dominance in the long-haul transmission arena. The fiber optic link has recently penetrated into the feeder portion of the local loop and evolution is continuing into the distribution portion of loop and then further into the drops to individual homes. Any FITL (fiber-in-the-loop) system deployed today must provide cost effective POTS (plain old telephone service) and yet be capable of carrying tomorrow's enhanced services. Thus, four elements are generally regarded as being essential to such a system. First, the system must have only two fibers per pedestal. Second, the upgrade plan must provide for the simultaneous transmission of telephony, AM, video, and broadband integrated services digital network (BISDN) in any mix at the pedestal. Third, upgrading one subscriber interface should not affect customer service at other subscriber interface units. Finally, the system must be reliable.

Single-mode optical fibers are the future of the telephone loop and have been exclusively used in various portions of the loop. They are relatively robust, economical, and have bandwidth capacity that far exceeds today's copper pairs. But placing fiber in the loop also presents significant technical challenges for telecommunications equipment suppliers and telephone company planners in the areas of cost, power, operations, and architecture. The design of an optical link, for example, involves many interrelated variables among the fiber, source, and photodetector operating characteristics. Link power budget analysis must be performed in order to compute the power margin, between the optical transmitter output and the minimum receiver sensitivity, that is needed to ensure a specified bit error rate (typically $1 \times 10^{-9}$). This margin is then allocated to connector, splice, and fiber losses, plus any additional margins required for expected component degradation or temperature effects.

The link loss budget is derived from the sequential loss contributions of each element in the link. The link power margin is normally provided to allow for component aging, temperature fluctuations, and losses arising from components that might be added at future dates. Essentially, the link margin is that level below nominal at which a "1" is still distinguishable from a "0" at the requisite error rate. A link margin of about 4 dB is generally used for systems that are not expected to have additional components incorporated into the link in the future. Maintenance and troubleshooting activities are primarily concerned with the detection and correction of faults in the individual fibers of the network.

Presently available monitoring techniques cannot be used to predict faults in the optical link. Once a system failure does occur, a fiber break or fault in any of the feeders between the CO and a splitter servicing a number of ONUs is typically detected by polling each of the ONUs and mapping their responses. If it is found that a group of ONUs does not respond, it can be assumed that the failure is in one of the feeder fibers. However, if only one individual ONU fails to respond, it is impossible to ascertain from polling data whether it is the fiber serving that ONU or the ONU itself that is at fault. So long as the question of fiber failure or ONU failure is unresolved, there is a strong possibility of dispatching a repair worker in error to the ONU or to the feeder. As each repair trip involves time and distance to service a remote location, the cost of erroneous dispatch can amount to hundreds of dollars per error.

There exists a need for link margin monitoring systems and techniques which can anticipate and call attention to the need for maintenance in an optical communication path before an unacceptably high bit error rate is experienced.

SUMMARY OF THE INVENTION

According to the present invention, the aforementioned need is addressed by an arrangement which directly monitors the rate of signal degradation in the individual fiber(s) of an optical communication network. When the power margin of a fiber link falls below a selected threshold, as indicated by a failure to detect reduced level signal portions that are launched from the upstream end of the link and returned thereto from the downstream end of the link, maintenance personnel are prompted to service or replace the affected optical link(s) before an unacceptably high error rate or a system failure is experienced. By enabling maintenance personnel to service the link prior to failure, the systems and techniques of the present invention substantially improve the overall reliability of any optical communication network.

In accordance with one embodiment of the present invention, a passive optical distribution network connects an downstream central office terminal to a number of upstream optical network units which service respective subscribers. Transmit and receive feeder fibers branch out to the optical network units with passive routing devices such as, for example, optical power splitters or active routing devices such as, for example, wavelength division multiplexers. An optical carrier is modulated with an amplitude-varied signal including at least two different amplitude levels above a selected threshold, with at least one of the amplitude levels being selected so that it will not be reliably detected by a detector circuit at the downstream end unless each fiber in the optical path between the central office and a destination optical network unit meets a threshold power margin. The amplitude-varied optical signal is transmitted upstream to each destination optical network unit. The portion of the signal containing the lower amplitude portions has no significance to the destination optical network unit and is ignored. A version of this signal, however, is returned to the detector circuit at the central office. The central office detector circuit monitors the returned version of the signal for the presence of the expected low amplitude level signal portions.

Illustratively, the use of an amplitude-varied signal in accordance with the present invention may be realized in an optical communication network in conjunction with conventional digital modulation techniques, with some pulses of the amplitude-varied digital signal representative of a binary "1" being at a different amplitude than other such pulses. In this regard, several different amplitude levels, corresponding to progressively lower power levels such as 9 dB, 6 dB, and so on, may be employed. As the amplitude level approaches the system threshold, illustratively 4 dB, needed to ensure the requisite bit error rate, fewer and fewer of the reduced amplitude pulses will be detected, thereby permitting margin analysis and identifying the need for servicing any affected fiber link(s). The remaining portion of the digitally modulated signal may be used to transmit data between the central office and optical network units. It will be readily appreciated by those skilled in the art, of course, that the system and technique of the present invention may also be used with optical communication systems employing analog modulation.

The above features and advantages of the present invention will become apparent from the ensuing description of several preferred exemplary embodiments, which should be read in conjunction with the accompanying drawings.

DETAILED DESCRIPTION OF THE INVENTION

The link margin monitoring systems and techniques of the present invention are more conveniently described with reference to an exemplary optical communication network, depicted in FIG. 1. It should be noted that the optical communication network architecture shown is purely illustrative and not intended to limit the scope of the invention. Rather, it is contemplated that the power margin monitoring technique of the present invention may be deployed in a wide variety of network architectures, including both broadcast and point-to-point arrangements.

Figure 1:
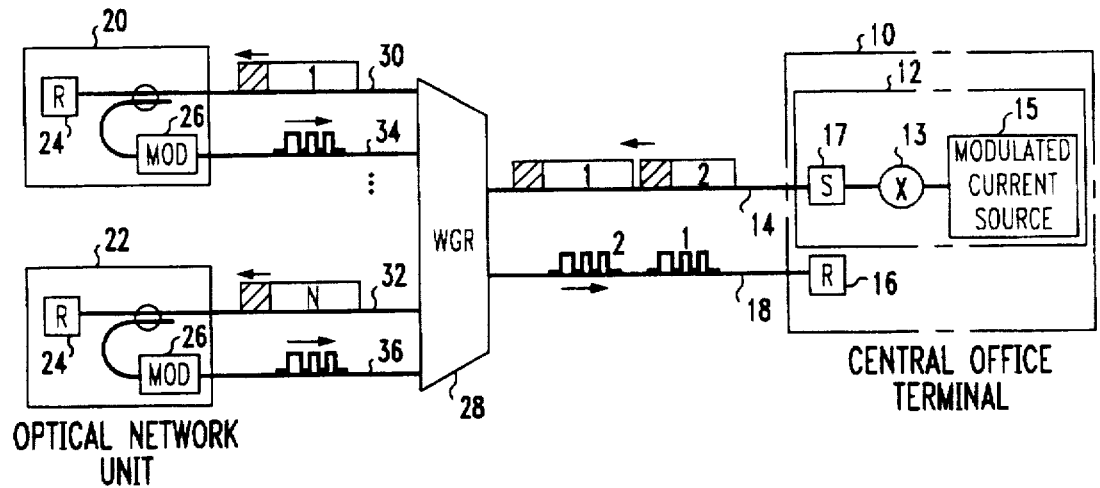
FIG. 1 depicts an illustrative broadcast optical network architecture configured to utilize an amplitude-varied optical signal for link margin monitoring in accordance with an exemplary embodiment of the present invention.

In the exemplary optical communication network of FIG. 1, central office terminal 10 includes an optical transmitter 12 for sending an optical signal of wavelength λ along an optical feeder fiber 14 and an optical receiver 16 for receiving a signal of the same or another wavelength via another fiber feeder line 18. Each subscriber, or group of subscribers, is connected to the optical network by an opto/electronic interface device, referred to as an optical network unit (ONU), as optical network units 20 and 22. In a practical arrangement, central office 10 may serve ten thousand or more subscribers, with each transmitter 12 of central office 10 serving to 8 to 32 ONUs. For clarity of illustration, however, only two ONUs are illustrated. Each ONU is capable of receiving optical signals which represent digitized communication signals. For this purpose, each ONU as ONUs 20 and 22 includes an optical receiver 24. In the illustrative system of FIG. 1, each ONU further includes a modulator 26 for modulating a portion of the optical signal received from central office with any upstream data to be returned thereto. Alternatively, each ONU may include its own optical transmitter such, for example, as a directly modulated solid state diode laser operating at a predetermined signal wavelength (in a passive optical network employing wavelength division multiplexing). As will be explained in detail below, the former arrangement is preferred since it permits monitoring of the entire loop defined between the central office and a given network unit from a single location. The latter arrangement, on the other hand, requires either independent monitoring of the two links interconnecting the central office and a given network unit or a hybrid arrangement in which a bypass fiber is optically coupled between the two links at the downstream end.

With continued reference to FIG. 1, it will be seen that the optical signal carried by feeder fiber line 14 is split at remote node 28. In the exemplary system, the remote node is a wavelength division multiplexer which, in a conventional manner, assigns a wavelength to each ONU. Optical signals from remote node 28 are carried to ONUs 20 and 22 by fibers 30 and 32, respectively. In a manner which will soon be explained, the modulator of ONUs 20 and 22 impresses data on packets and sends them back to the central office via fibers 34 and 36 and remote node 28, respectively.

Figure 2:
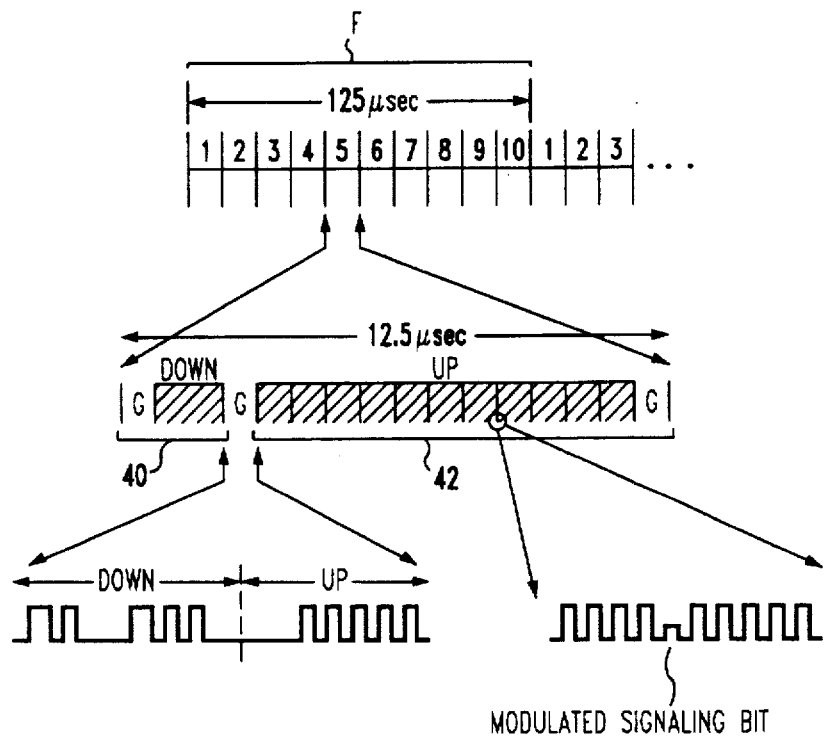
FIG. 2 depicts the downstream and upstream modulation of an optical signal, for one slot of a 125 microsecond data frame, in accordance with the exemplary system of FIG. 1.

FIG. 2 depicts a typical 125 μsec data frame in the exemplary system of FIG. 1. As utilized herein, the phrase "downstream signal" refers to a signal en route from central office 10 to a destination ONU while "upstream signal" refers to a signal en route from an ONU to the central office. As seen in FIG. 2, each frame F provides ten 12.5 μsec slots for ten subscribers associated with a given ONU. Slot 5 of frame F is shown with shading to suggest modulation at an embedded clock rate such, for example, as 50 Mb/s. Each slot, as slot 5, illustratively comprises a first signal portion 40 configured as a downstream burst and a second signal portion 42 configured as a "chalkboard" for accommodating upstream modulated signals. Guard bands G prevent unintentional signals generated by a switching tunable laser from interfering with ONUs at intermediate wavelengths. On the downstream portion, modulation delivers 20 or so message bits plus capture and framing bits in a downstream packet of about 0.5 μsec duration. The second portion of the downstream signal, as indicated above, is the "optical chalkboard" which in the illustrative example is a 25 MHz clock (e.g. a 50 Mb/s "10101010 . . . " sequence). This is the portion which may be modulated with upstream information at an ONU.

Figure 3A:
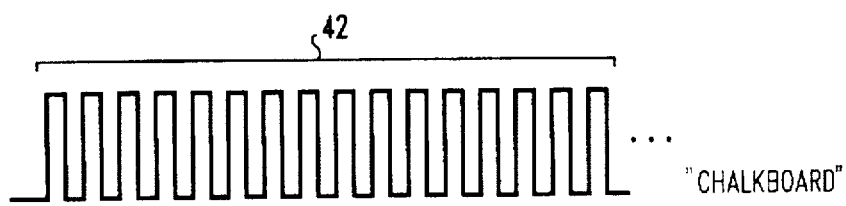
FIGS. 3A-3C show modulation of the embedded clock from the central office by an optical network unit's modulator to produce an upstream optical signal.
Figure 3B:
Figure 3C:

FIGS. 3A-3C illustrate modulation of a part of the embedded clock signal portion 42 (FIG. 3A). Illustratively, modulator 26 of ONU 20 is a relatively slow asynchronous modulator, producing the signal of FIG. 3B. In this case, the modulator 26 is so slow that in the time it takes to modulate a single one or zero for data, there have been many ticks of the 25 MHz clock. The resultant upstream optical signal is shown in FIG. 3C. As will be readily ascertained by those skilled in the art, clock recovery at central office 10 is simplified since it is known that the upstream clock is identical to the rate sent by the central office 10 to the ONUs.

Having discussed in detail one type of optical communication network, in which optical signals originating at a central office are transmitted to and returned from an upstream terminus of an optical link, an illustrative embodiment of the monitoring technique of the present invention will now be described in detail. Before proceeding further, however, it should be emphasized that the monitoring technique of the present invention does not require modulation of the second portion of the downstream signal with any upstream data. The capacity for such modulation merely reflects an advantage unique to that particular architecture. In any event, and with particular reference now to FIGS. 4A–4D, there is seen an example of varied amplitude modulation of the second optical signal portion 42 (FIG. 2) in accordance with the teachings of the present invention.

Figure 4A:
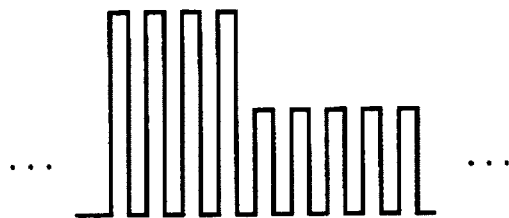
FIGS. 4A depicts the transmission of a varied amplitude optical signal from the downstream end to the upstream end in accordance with an illustrative embodiment of the present invention.
Figure 4B:
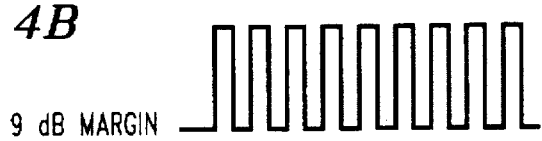
FIGS. 4B-4D illustrate the detection of the reduced amplitude signal portions of FIG. 4A as the link margin of the system of FIG. 1 deteriorates.
Figure 4C:
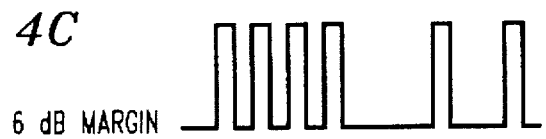
Figure 4D:

As seen in FIG. 4A, some of the clock ticks in the second optical signal portion are attenuated, prior to launching into the fiber by the central office transmitter, to a lower amplitude level which is still above the threshold distinguishing a "1" from a "0". For this purpose, transmitter 12 includes, by way of example, an attenuator 13 coupled between a modulated current source 15 and a directly modulated optical source 17 such, for example, as a light emitting diode or laser, as shown in FIG. 1. The central office launches the optical signal portion containing the reduced amplitude pulses during a time slot associated with a given ONU. The first data bit of an upstream packet may then, for example, be configured as a "1" containing the reduced lower amplitude pulses. The central office receiver 16 monitors the signal returned from the ONUs via feeder fiber 18, expecting to see the reduced amplitude pulses it placed in the downstream signal present in the upstream signal. As such, before the reduced amplitude clock ticks in the aforementioned "1" return to the central office, receiver 16 resets its detection threshold and attempts to detect the clock ticks. If the system margin is good (perhaps 9 dB), all of these reduced amplitude pulses are detected (FIG. 4B). After the system margin has degraded to a point approaching 6 dB (FIG. 4C), only some of these are detected. When few or none of the ticks are detected, it can be seen that the margin, which may now be down to approximately 3 dB, is now very close to the system threshold (FIG. 4D). Thus, the CO has a way of measuring its link margin while the circuit is in use, and these measurements may be abstracted and stored. These measurements could be compared against norms or historical records to generate flags for the network operator.

Figure 5:
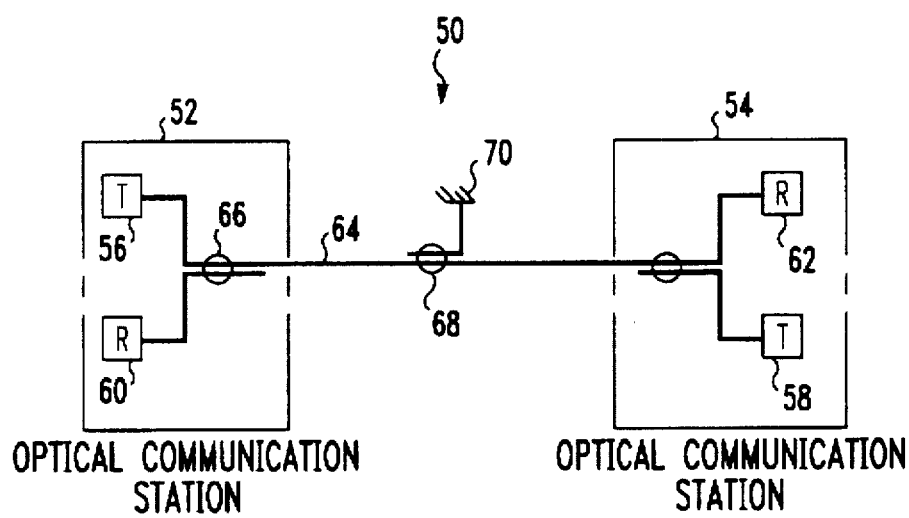
FIG. 5 depicts an illustrative point-to-point link architecture configured to utilize an amplitude-varied optical signal for link margin monitoring in accordance with the present invention.

The monitoring technique of the present invention may be further adapted for use in a point-to-point communication network. In this regard, however, additional optical signal processing steps are required. With reference to FIG. 5, there is shown an illustrative point-to-point optical communication system 50. As seen in FIG. 5, system 50 includes a first optical communication station 52 and a second optical communication station 54. Each of optical communication stations 52 and 54 includes an optical transmitter 56, 58, and an optical receiver 60, 62. A single bi-directional fiber link 64 interconnects optical communication stations 52 and 54, with conventional couplers 66 and 68 optical providing a second terminal at each end of the link. For a purpose which will now be explained, system 50 further includes a third optical coupler 68 disposed proximate second station 54 that terminates into a reflecting mirror 70 or other reflecting device. Mirror 70 returns a replica of the downstream optical signal back to first station 52, with the remainder of the downstream optical signal being received by receiver 62 of second station 54. As in the case of the preceding embodiment, the downstream contains reduced amplitude portions, which may again be discrete pulses in the case of a digital transmission scheme.

As will be readily appreciated by those skilled in the art, the optical signals received by first optical station 52 must be specially processed to permit separation and subsequent analysis. Suitable techniques for accommodating this, however, are well known and are not deemed to constitute a novel aspect of the present invention. Accordingly, a detailed description of these techniques has been omitted here.

The monitoring process of the present invention may, with several adaptations, also be employed with conventional passive optical networks—which are essentially two one-way links. Illustratively, reflecting devices of the type utilized with the point-to-point system of FIG. 5 may be interposed in the fibers proximate each receiver (for both the ONUs and the central office), with the ONUs being configured to include reduced amplitude signal portions in the upstream signal they transmit to the central office and to monitor the communication link for such signal portions in the reflected signal that is returned therefrom. The central office, as was the case in the point-to-point system, monitors the reflected downstream signal in an identical manner. Here, the same optical signal separation and analysis problems associated with a point-to-point arrangement are present and may be dealt with using conventional techniques. It should be noted that the ONUs may alternatively be configured to directly monitor the incoming link from the central office for reduced amplitude pulses in the downstream signal and to include their own reduced amplitude pulses in the upstream signal for detection at the central office. Such monitoring, however, would necessarily be preceded by a previous transmission notifying the central office or ONU, as the case may be, to reset its detection threshold for an appropriate interval.

The preceding discussion has been restricted to digital modulation, since that appears most promising for optical transmission in the near future. However, it will be readily understood that the link power margin monitoring technique of the present invention is equally applicable to other modulation formats. For example, if linearity is not too severe a problem, direct analog modulation of LEDs (or perhaps even lasers) is possible. In such a case, a reduced amplitude signal portion of such an analog signal may be launched by and returned to the central office, in the same manner as discussed above.

From the foregoing, it should be readily ascertained that the invention is not limited by the embodiments described above which are presented as examples only but may be modified in various ways within the intended scope of protection as defined by the appended patent claims.

What is claimed is:

1. A method of operating a digital communication network comprising a first optical communication station having an optical transmitter and a signal monitoring device, a second optical communication station having a signal receiving device, and a communication path coupling the first optical communication station to the second optical communication station, the method comprising:

launching a signal having at least two different levels into the communication path from the first communication station to the second optical communication station, said signal comprising at least one first signal portion having an amplitude that exceeds a predetermined amplitude threshold and at least one second signal portion having an amplitude between the amplitude of the first signal portion and the predetermined amplitude threshold;

returning a portion of the signal to the first optical communication station via the communication path; and evaluating at the signal monitoring device the returned signal for a presence of said second signal portion, the amplitude of the second signal portion selected so that said second signal portion will not be reliably detected when a power margin of the path is below a minimum acceptable threshold;

wherein the first and the second signal portions occupy sequential and non-overlapping time slots of the optical signal.

2. The method of claim 1, wherein the communication network is an optical network and the signal is an optical signal.

3. The method of claim 1, further including generating an alerting signal when said second signal portion is not detected by the signal monitoring device.

4. The method of claim 1, wherein each first signal portion comprises an optical pulse.

5. The method of claim 1, wherein said signal launching step includes launching a plurality of first signal portions, each of said first signal portions comprising an optical pulse, to digitally transmit data from the first optical communication station to the second optical communication station.

6. The method of claim 1, wherein each second signal portion comprises an optical pulse.

7. The method of claim 6, wherein said signal launching step includes launching a plurality of second signal portions, each of said second signal portions comprising an optical pulse.

8. The method of claim 7, wherein some of said second signal portions have differing amplitudes.

9. The method of claim 7, further including modulating some of the second signal portions at the second optical communication system to digitally transmit data from the second optical communication system to the first optical communication system.

10. The method of claim 1, wherein said returned signal includes a portion of said signal reflected to the first optical communication station.

11. The method of claim 1, further including:
receiving said signal at the second optical communication station; and
modulating at least a portion of the received signal with data to be transmitted to the first optical communication station.

12. A method of monitoring a power margin of an optical path in an optical communication network, wherein the optical path is coupled to a first optical communication station having an optical transmitter and a signal monitoring device and a second optical communication station having a receiving device, the method comprising:
launching an amplitude-varying optical signal into the optical path from the first optical communication station to the second optical communication station, said signal comprising at least one first signal portion having an amplitude that exceeds a predetermined amplitude threshold and at least one second signal portion having an amplitude between the amplitude of the first signal portion and the predetermined amplitude threshold;
receiving said optical signal at the second optical communication station;
returning said optical signal to the first optical communication station via the optical path; and
the signal monitoring device evaluating the returned optical signal at the first optical communication station with the signal monitoring device for a presence of said second signal portion, the amplitude of the second signal portion selected so that the second signal portion will not be reliably detected at the first optical communication station when the power margin of the optical path is below a minimum acceptable threshold;

wherein the first and the second signal portions occupy sequential and non-overlapping time slots of the optical signal.

13. The method of claim 12, wherein the optical communication network is a passive optical network.

14. The method of claim 12, wherein the optical path comprises unidirectional links.

15. The method of claim 12, wherein each first signal portion comprises an optical pulse.

16. The method of claim 12, wherein said launching step includes launching a plurality of first signal portions, each of said first signal portions comprising an optical pulse, to digitally transmit data from the first optical communication station to the second optical communication station.

17. The method of claim 16, further including modulating some of the second signal portions at the second optical communication station to digitally transmit data from the second optical communication station to the first optical communication station.

18. The method of claim 12, wherein each second signal portion comprises an optical pulse.

19. The method of claim 12, wherein said launching step includes launching a plurality of second signal portions, each of said second signal portions comprising an optical pulse.

20. The method of claim 19, wherein some of said second signal portions have differing amplitudes.

21. A method of monitoring performance of a digital transmission system in which digital data pulses are transmitted from a transmitter of a first digital transmission system to a receiver of a second digital transmission system via a communication channel extending between the first and second digital transmission systems, said method comprising:
sending evaluation pulses, that are modulated with the digital data pulses, from the transmitter to the receiver, each evaluation pulse having a selected level such that that evaluation pulse will not be reliably detected at the receiver when a power margin of the communication channel is below a minimum acceptable threshold; and
measuring a number of the evaluation pulses successfully transmitted to the receiver.

22. The method of claim 21, further including generating an alerting signal when the number of the evaluation pulses transmitted to the receiver falls below a selected threshold.

23. The method of claim 21, wherein the communication channel comprises at least one optical fiber.

24. The method of claim 1, wherein the first signal portion and the second signal portion occur at a distinct time.

25. The method of claim 1, wherein the detection of the second signal portion is performed with a digital determination.

26. The method of claim 25, wherein the digital determination discrimination for the first signal portion and the second signal portion is the same.

27. The method of claim 12, wherein the first signal portion and the second signal portion occur at a distinct time.

28. The method of claim 12, wherein the detection of the second signal portion is performed with a digital determination.

29. The method of claim 28, wherein the digital determination discrimination for the first signal portion and the second signal portion is the same.

* * * * *